(12) United States Patent
Bosch et al.

(10) Patent No.: US 8,685,300 B2
(45) Date of Patent: Apr. 1, 2014

(54) THERMOFORMING DEVICE WITH A PLURALITY OF CUTTING LINES

(75) Inventors: Antoni Bosch, Sprang-Capelle (NL); Martijn Haex, Waalwijk (NL)

(73) Assignee: Bosch Sprang Beheer B.V., SPRANG-Capelle (NL)

( * ) Notice: Subject to any disclaimer, the term of this patent is extended or adjusted under 35 U.S.C. 154(b) by 105 days.

(21) Appl. No.: 13/257,237

(22) PCT Filed: Mar. 18, 2010

(86) PCT No.: PCT/NL2010/050143
§ 371 (c)(1),
(2), (4) Date: Nov. 17, 2011

(87) PCT Pub. No.: WO2010/107314
PCT Pub. Date: Sep. 23, 2010

(65) Prior Publication Data
US 2012/0061873 A1    Mar. 15, 2012

(30) Foreign Application Priority Data

Mar. 18, 2009 (NL) ..................................... 1036728
Apr. 9, 2009 (NL) ..................................... 1036841

(51) Int. Cl.
*B29C 51/32* (2006.01)
(52) U.S. Cl.
USPC ........... 264/163; 264/154; 264/322; 264/291; 264/292; 264/46.8; 264/319; 264/327; 264/DIG. 66; 425/292; 425/297; 425/384; 425/389; 425/235
(58) Field of Classification Search
USPC ........ 264/154, 163, 291, 292, 46.8, 319, 322, 264/327, DIG. 66; 425/292, 297, 384, 389, 425/235; 47/65.5, 65.7
See application file for complete search history.

(56) References Cited

U.S. PATENT DOCUMENTS

2008/0263942 A1   10/2008   Hansen et al.

FOREIGN PATENT DOCUMENTS

DE         10017042 A1 * 11/2001
EP         1142691        10/2001

OTHER PUBLICATIONS

International Search Report for PCT Application No. PCT/NL2010/050143, dated Jun. 30, 2010.

\* cited by examiner

*Primary Examiner* — Joseph S Del Sole
*Assistant Examiner* — Lawrence D Hohenbrink, Jr.
(74) *Attorney, Agent, or Firm* — Edward J. Baba; Bozicevic, Field & Francis LLP (57) ABSTRACT

The present invention relates to a thermoforming device for thermoforming a product (1) from a plastic foil (23), and to a corresponding method. The invention relates particularly to a thermoforming process and device in which a slot (2) is arranged in a product (1) to be formed. The invention also relates to a product (1), particularly a flowerpot, manufactured using this thermoforming device or method. The thermoforming device is characterized in that the cutting sleeve (10) and cutting plate (7) and/or hold-down element (8) define an auxiliary cutting line through which the plastic foil (23) is cut in order to arrange a slot (2) in the product (1) to be formed. The functions of slot-forming and product-foil separation are hereby performed by substantially the same components.

22 Claims, 13 Drawing Sheets

THERMOFORMING DEVICE WITH A PLURALITY OF CUTTING LINES

The present invention relates to a thermoforming device for thermoforming a product from a plastic foil, and to a corresponding method. The invention relates particularly to a thermoforming process and device in which a slot is arranged in a product to be formed. The invention also relates to a product, particularly a flowerpot, manufactured using this thermoforming device or method. The invention further relates to mould parts used in this thermoforming device.

Thermoforming is a known technique. It makes use of the fact that the form of thermoplastic materials such as polypropylene (PP), polystyrene (PS) or polyethylene (PET) can be changed when they are heated sufficiently.

A typical thermoforming device for forming the heated material comprises two moulds, a first (upper) mould and a second (lower) mould, wherein the heated plastic material, preferably in the form of a foil, is placed between the two moulds. When the mould halves are closed the plastic material is carried by a pre-stretcher into the mould cavities of the mould. An increased pressure is then applied to press the plastic against the wall and the bottom of the mould cavity. Because the wall and the bottom of the cavity are kept at relatively low temperature, the plastic will take on a fixed form. The combination of upper and lower mould usually comprises a plurality of mould cavities.

The thermoforming process which forms the subject-matter of the present application relates to a process of combined forming and cutting. Once the product has been formed in the forming sleeve, the whole is here cut out of the foil by a cutting plate in the upper mould and a cutting sleeve co-acting therewith in the lower mould. These cutting components have a very high dimensional accuracy and a very small cutting clearance. The cutting sleeve moves in the cutting plate and will then sever the foil. After the formed product has been cut out, the product is taken from the mould, after which it can be collected or stacked.

Diverse products such as plastic beakers, flowerpots and packaging containers are formed with the relevant thermoforming technique. Particularly relevant to the present invention is the application of the thermoforming technique for the manufacture of flowerpots used in horticulture.

Flowerpots can be provided with one or more slots in the upper edge for the placing of a label. The labels can for instance be provided with product information.

The arranging of these slots in a formed pot is possible in a number of ways. In the present prior art the slots are arranged in a separate station by a punching technique. This takes place by making use of a punch knife and punch plate, wherein the knife is actuated to cut through the foil and wherein the punch plate serves as stop for the knife.

The drawback of this (punching) technique is that it is sensitive to various influences such as the plastic foil used, the temperature of this foil, the quality of the punch knife and the parallelism of machine, mould and punch knife, as well as the applied punching force. An irregular punching pattern may hereby occur. Owing to this irregular punching pattern not all slots are punched completely through, and these products will then be rejected. This principle also involves frequent maintenance since the punch knives must be regularly changed.

In EP 1142691 a slot is arranged in the product by a knife-like component situated in the form cutting mould. This system also has the above stated drawbacks.

An object of the present invention is to improve the known thermoforming process, whereby a completely cut slot can be obtained in a formed product by means of a relatively inexpensive and reliable construction.

This object is achieved with a thermoforming device which comprises a first mould provided with a cutting plate and a 'niederhalter' or hold-down element accommodated movably in this mould, and a second mould provided with a forming sleeve and a cutting sleeve. The first and second mould are here movable relative to each other for the purpose of at least partially forming and cutting the plastic foil. The hold-down element and cutting sleeve are adapted to clamp the plastic foil at least during the forming of the product, but preferably also during the cutting. It is further the case that the cutting sleeve and cutting plate together define a cutting edge through which the plastic foil is cut in order to separate the product formed in the forming sleeve from the surrounding plastic foil. The thermoforming device according to the invention is characterized in that the cutting sleeve and the cutting plate and/or hold-down element further define an auxiliary cutting line through which the plastic foil is cut in order to arrange a slot in the product to be formed. The auxiliary cutting line is therefore defined by co-action of the cutting sleeve and the hold-down element, by co-action of the cutting sleeve and the cutting plate or by co-action of cutting sleeve, cutting plate and hold-down element.

An advantage of the above device is that no additional components or movements are necessary relative to the prior art to arrange the slot in the product. The cutting technique further provides advantages relative to the known punching technique in respect of the durability of the components used. The cutting parts of the thermoforming device according to the invention need replacing or repairing less quickly. These advantages are possible due to the above stated integration of slot-forming and product-foil separation.

The slot is preferably arranged in an edge of the product. The auxiliary cutting line and the cutting line are preferably defined at a distance from each other. This means that the slot is received wholly in the edge of the product and completely enclosed by plastic foil.

A recommended option for defining the auxiliary cutting line is based on the use of co-acting profiling in the cutting sleeve and the cutting plate and/or hold-down element. The cutting plate and/or hold-down element and the cutting sleeve here preferably each have an individual profiling, which can co-act in order to define the auxiliary cutting line. In practice the first and second mould are carried toward each other, wherein the profilings come into close proximity and possibly pass alongside each other at least partially, whereby the plastic foil lying between is cut.

The profiling need not run along the full periphery of the cutting plate and/or hold-down element and/or cutting sleeve, it can also be discontinuous. A slot is hereby only formed locally in the final product. This in contrast to a slot which would run over the full periphery in the case of a beaker. Such a slot would in that case result in the outer edge part breaking off.

The cutting plate and/or hold-down element preferably comprises an upper profiling and the cutting sleeve a lower profiling, these being at least partially complementary. The designations upper and lower profiling are related to the usual arrangement of the first and second mould. The designation must not be interpreted as the upper profiling being present only on an upper side. Owing to the complementary relation the cutting clearance can be kept small, whereby a good cutting action is obtained.

In an embodiment of the present invention the hold-down element is provided with a protrusion which is directed toward the cutting sleeve and which can co-act with a recess in the cutting sleeve in order to define the auxiliary cutting line. In this embodiment the hold-down element has for instance a protruding edge part on a side directed toward the cutting sleeve. This edge part can be at least partially received in a matching recess in the cutting sleeve. During relative movement of the moulds the walls of the recess and the protruding edge part will co-act and the foil will be cut along an auxiliary cutting line defined by these parts.

The hold-down element can comprise a profiling which is at least partially complementary to a profiling of the cutting plate. The hold-down element can hereby match the cutting plate well, which on the one hand is good for the clamping of the plastic foil and on the other provides the necessary room to move for the relative movement of hold-down element and cutting plate.

It is recommended that both upper profiling and lower profiling comprise a plurality of platforms at different levels, wherein walls between the different platforms in the cutting plate and/or hold-down element and cutting sleeve together define at least said auxiliary cutting line. An example of a platform is a part of the profiling running parallel to the upper edge of the product to be formed. In a normal vertical arrangement of the thermoforming device, wherein the first and second mould moreover correspond to respectively upper and lower mould, the platforms are parts of the profiling which run substantially horizontally, provided this is also the case for the upper edge of the product to be formed.

The above walls can co-act during relative movement of the first and second mould in order to obtain a cutting action. Foil enclosed between the walls is here cut through. The profiling used can otherwise define both the cutting line and one or more auxiliary cutting lines.

The upper profiling of the cutting plate can comprise a protrusion which is directed toward the hold-down element, wherein the hold-down element and cutting sleeve both comprise a recess which is at least partially complementary to this protrusion. The cutting plate generally has a cylindrical recess in which the hold-down element, and optionally the pre-stretcher, are received. The above mentioned protrusion thus extends into this recess. The hold-down element must for this purpose have an at least partially complementary recess.

A surface of the protrusion facing toward the product to be formed is preferably placed at a different level from another surface of the cutting plate associated with the definition of the cutting line. In the regular setup referred to above this means that the underside of the protrusion lies at a different height from the rest of the cutting plate, and then mainly the part which contributes toward the cutting action during the separation of product and foil. It is otherwise recommended that this protrusion be placed higher. The above mentioned surface of the protrusion is generally placed here at a greater distance from an outer side of the first mould facing toward the second mould than said other surface of the cutting plate.

A particularly recommended profiling for the lower profiling comprises a first lower platform for clamping the plastic foil and a second lower platform connected to the first lower platform by means of a first lower wall. A matching upper profiling can then comprise a first upper wall and a first upper platform, wherein the first upper platform is connected to the first upper wall. The first upper wall and first lower wall here together define the auxiliary cutting line.

It is further possible for the lower profiling to further comprise a third lower platform connected to the second lower platform by means of a second lower wall, and for the upper profiling to further comprise a second upper platform connected to a second upper wall. The second upper wall and the second lower wall here define the cutting line.

It is possible for the second upper wall not to be fixedly connected to the first upper platform. This is for instance the case if the upper profiling is distributed over the hold-down element and cutting plate. It is however also possible for the first upper platform and second upper platform to be mutually connected by means of the second upper wall.

Said lower platforms preferably slope downward relative to an outer side of the second mould facing toward the first mould as seen from the first lower platform, and said upper platforms likewise slope downward relative to an outer side of the first mould facing toward the second mould as seen from the first upper wall. In the regular setup referred to above this results in a lower profiling which runs stepwise downward as seen from the product and in an upper profiling which likewise runs stepwise downward as seen from the product, albeit that the cutting plate extends upward and the cutting sleeve extends downward.

It is advantageous if said upper profiling is mounted releasably on said cutting plate and/or said hold-down element for the purpose of exchanging the upper profiling. If the cutting properties of the cutting components deteriorate, the cutting parts are sharpened. By arranging the protrusion for arranging the slot on a removable part in the cutting plate and/or hold-down element, this component can be exchanged. A less complex sharpening technique can then be used to sharpen this cutting surface of the separate component than if this part were to form an integral part of the cutting plate.

The standard cutting parts (cutting plate and/or hold-down element and cutting sleeves) in the relevant mould have a very high dimensional accuracy and a very small cutting clearance. In order to centre the cutting parts it is advantageous to provide the thermoforming device, and particularly the mould or moulds, with a number of guides. It is recommended here that the guides mutually centre at least two of the first mould, the second mould, the hold-down element, the forming sleeve and the cutting sleeve.

The present invention also provides a method for thermoforming of a product from a plastic foil. This method comprises of clamping the plastic foil between a hold-down element in a first mould and a cutting sleeve in a second mould, then forming the product in a forming sleeve in the second mould and moving first and second mould relative to each other in order to separate the product formed in the forming sleeve from the surrounding plastic foil. The separation here comprises of cutting through a cutting line defined by the cutting sleeve and cutting plate by means of relative movement of first and second mould.

The method according to the invention is characterized by arranging a slot in the product to be formed by cutting through an auxiliary cutting line defined by the cutting sleeve and cutting plate and/or hold-down element by means of relative movement of first and second mould. This arranging preferably takes place prior to the forming of the product.

The method can further comprise of pre-cutting the plastic foil by means of relative movement of first and second mould for the purpose of closing a cavity defined by the clamped plastic foil and the first and/or second mould. Owing to this closure it is easier to carry the plastic foil against the wall of the forming sleeve using compressed air. The pre-cutting preferably takes place after clamping of the plastic foil. Subject to the profiling this pre-cutting takes place simultaneously with, prior to or after arranging of the slot.

In the method according to the invention the different components such as cutting plate, cutting sleeve and hold-down element can be provided with a profiling as discussed above.

The invention also provides a product formed using a thermoforming device as discussed above or by applying a method as discussed above. An example of such a product is a flowerpot with an upper edge in which the slot is arranged for placing of a product label.

The invention likewise provides a mould part for a thermoforming device embodied as the first or second mould as described above. It is noted here that such a mould generally has a plurality of product-forming elements for simultaneous production of multiple products.

The invention will be discussed in more detail hereinbelow with reference to the accompanying figures, in which.

Figure 1:
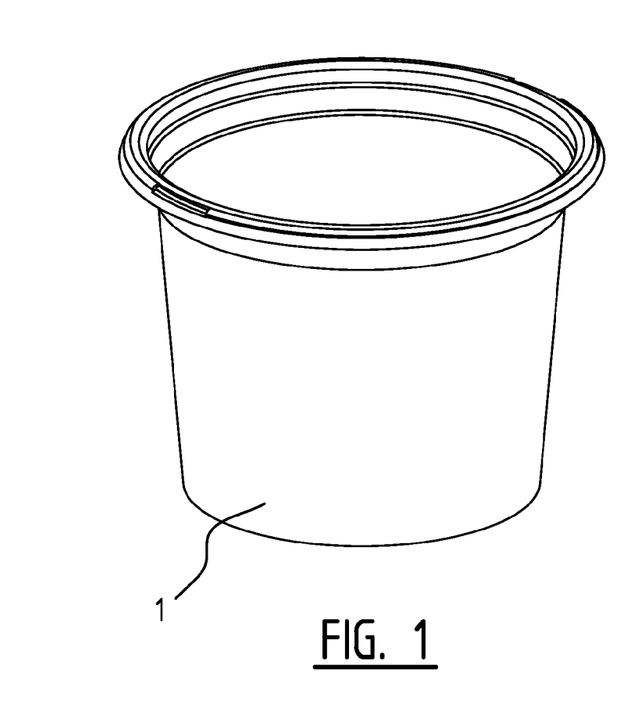
FIG. 1 shows a flowerpot manufactured using a thermoforming device according to the present invention.
Figure 2:
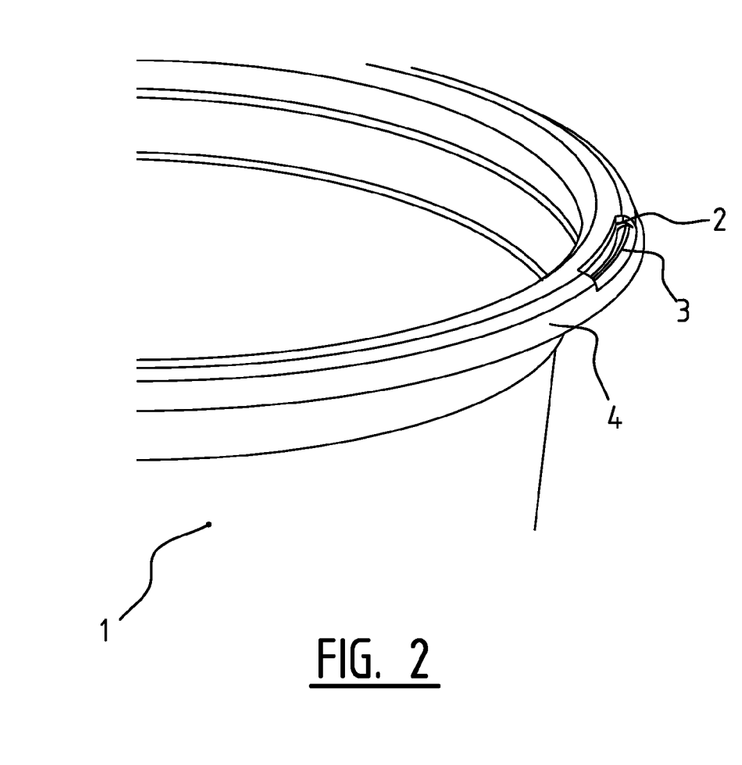
FIG. 2 shows a detail view of the flowerpot of FIG. 1.

FIGS. 1 and 2 show a flowerpot 1 manufactured using a thermoforming device or by means of a thermoforming method according to the invention. FIG. 2 in particular shows slot 2. The cut(s) in the product form a tongue 3 at this position which is attached on one side to edge 4 of flowerpot 1. A label for instance displaying information about the plant present in the flowerpot can be placed through the slot.

Figure 3:
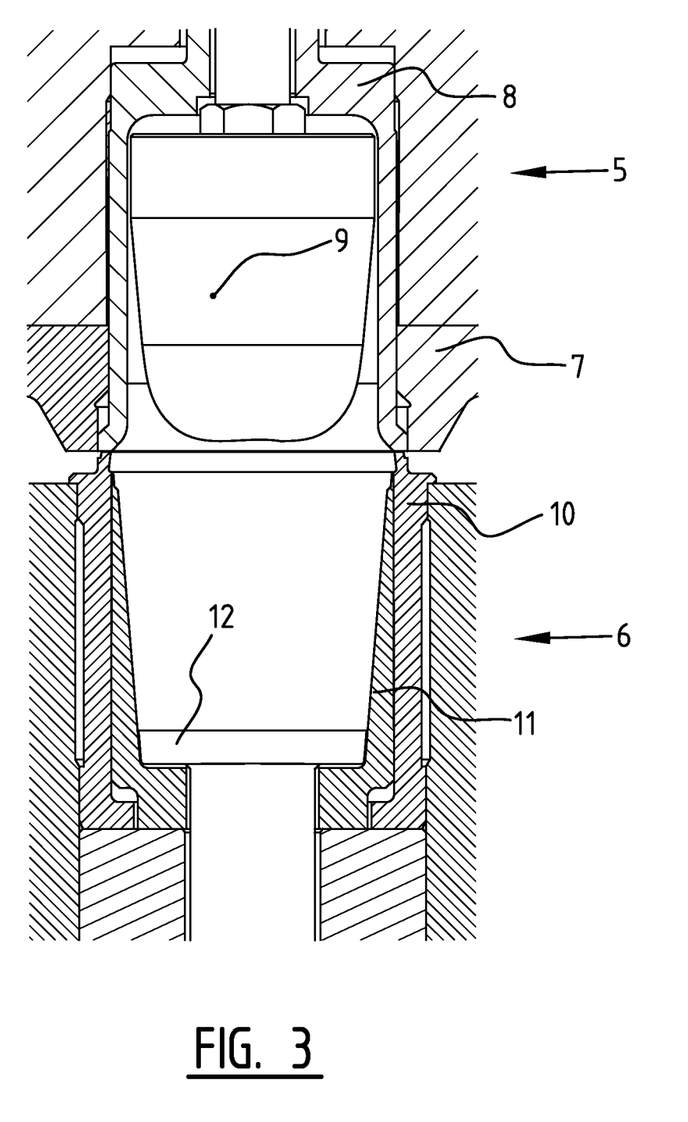
FIG. 3 shows a cross-section of an embodiment of an assembly of upper and lower mould according to the present invention.

FIG. 3 shows the construction of a thermoforming device comprising a first (upper) mould 5 and a second (lower) mould 6. Upper mould 5 is constructed from, among other parts, a cutting plate 7 having accommodated movably therein a hold-down element 8 and a pre-stretcher 9. Lower mould 6 is constructed from, among other parts, a cutting sleeve 10 having therein a forming sleeve 11 and a forming base 12.

Figure 4:
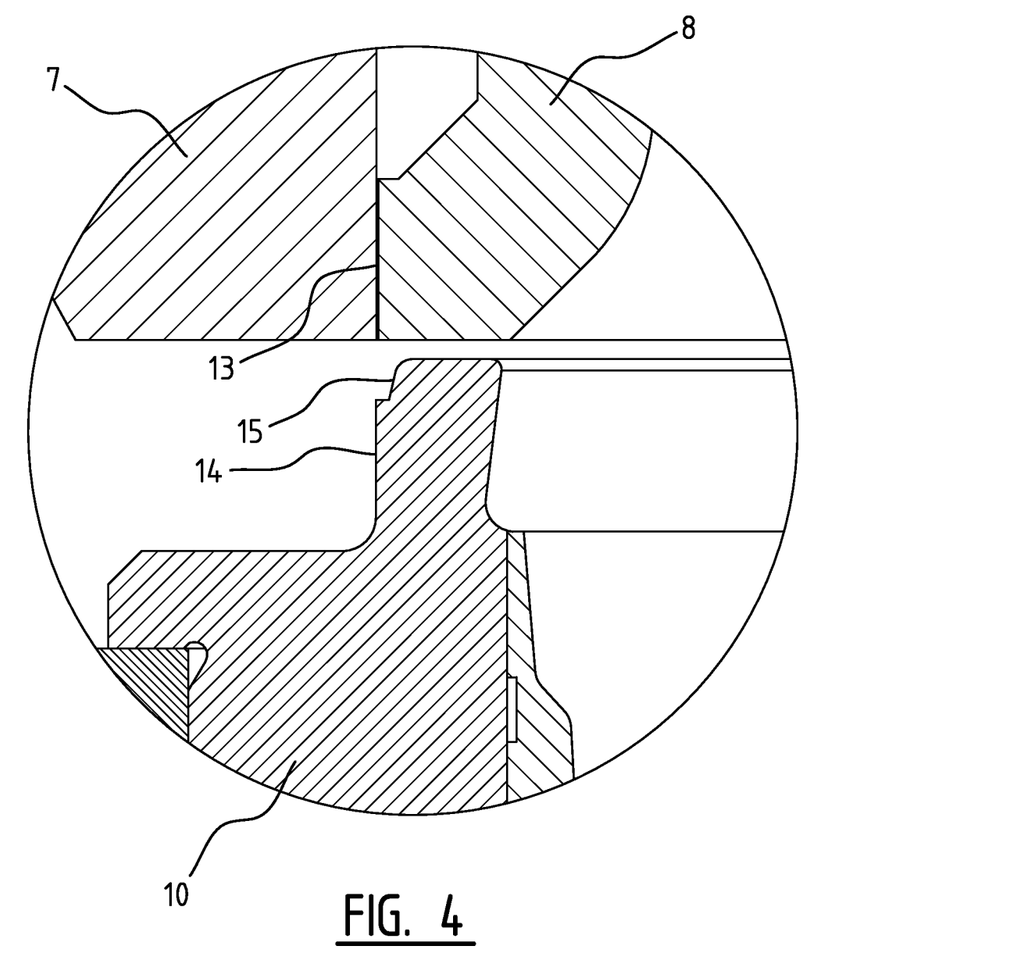
FIG. 4 shows a detail view of the cross-section of FIG. 3.

FIG. 4 shows a cross-section of the embodiment of FIG. 3. The cross-section is taken at a position where no profiling is present for the purpose of forming a slot. Shown are walls 13 and 14 of respectively cutting plate 7 and cutting sleeve 10. These walls together define a cutting line through which the plastic foil will be cut during separation of product and foil. Profile 15 is present for a good (U-shaped) edge formation.

Figure 5:
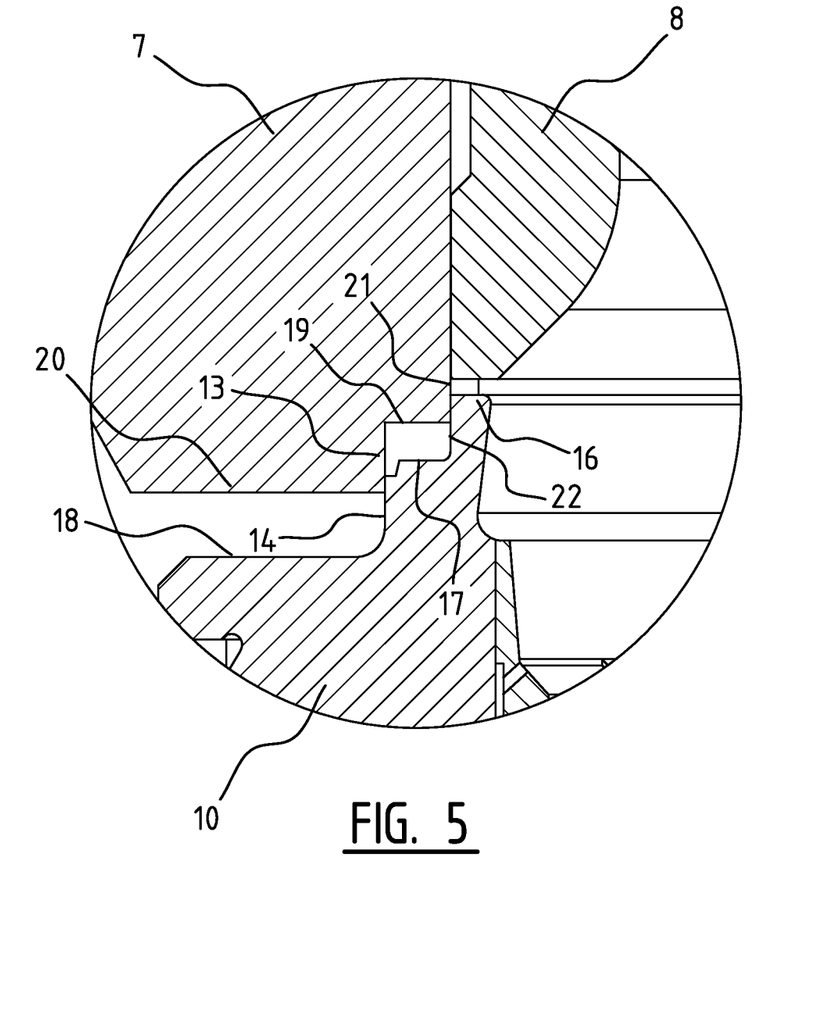
FIG. 5 shows a detail view of a cross-section taken at the position of a profiling for forming a slot in a product according to a first embodiment of the present invention.

FIG. 5 shows the same cross-section, taken this time however at a position where a profiling is present. In this embodiment the auxiliary cutting line is defined by a profiling on the cutting plate and the cutting sleeve. Shown in the profiling of the cutting sleeve are first lower platform 16, second lower platform 17 and third lower platform 18. Also shown in the profiling of the cutting plate are first upper platform 19 and second upper platform 20. First upper wall 21 and first lower wall 22 define the auxiliary cutting line through which the plastic foil will be cut in order to form a slot. Also shown are second upper wall 13 and second lower wall 14, which have a function similar to the corresponding walls in FIG. 4.

Figure 6A:
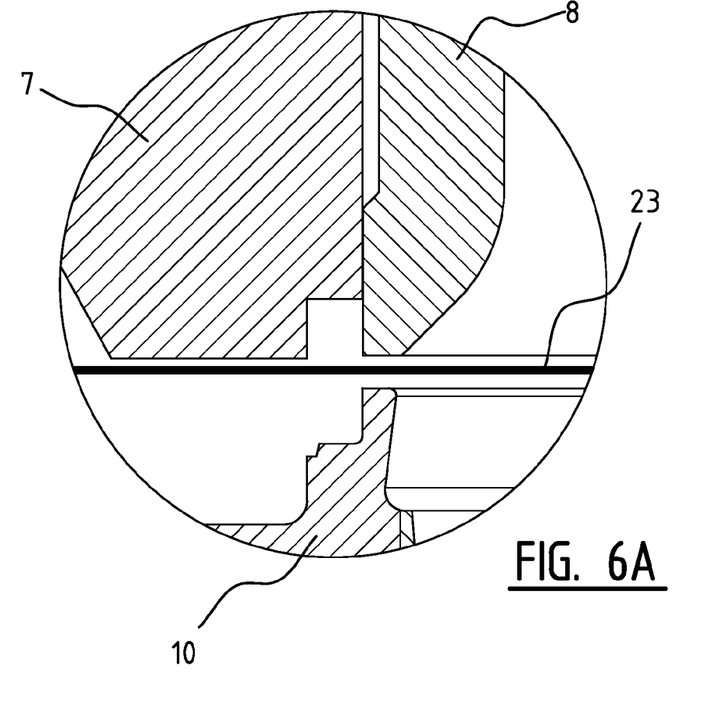
FIGS. 6A-6D show the most important process steps of the thermoforming method according to the invention making use of the embodiment of FIG. 5.
Figure 6B:
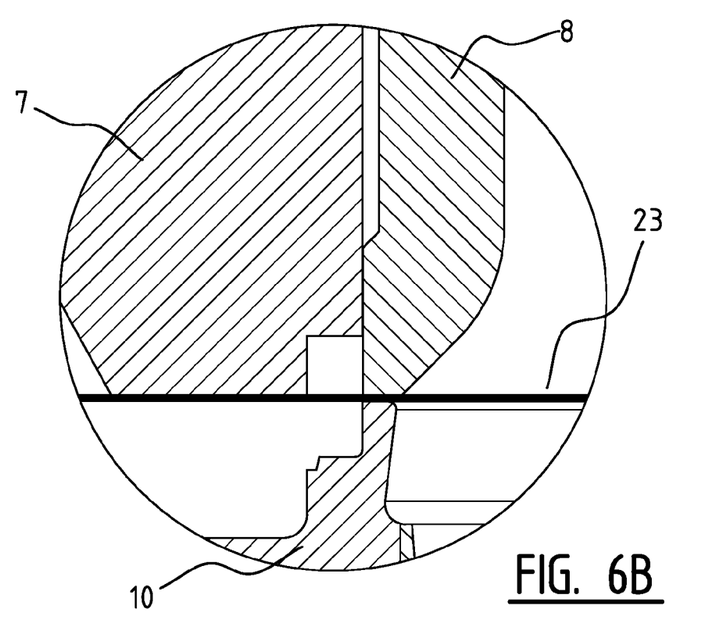
Figure 6C:
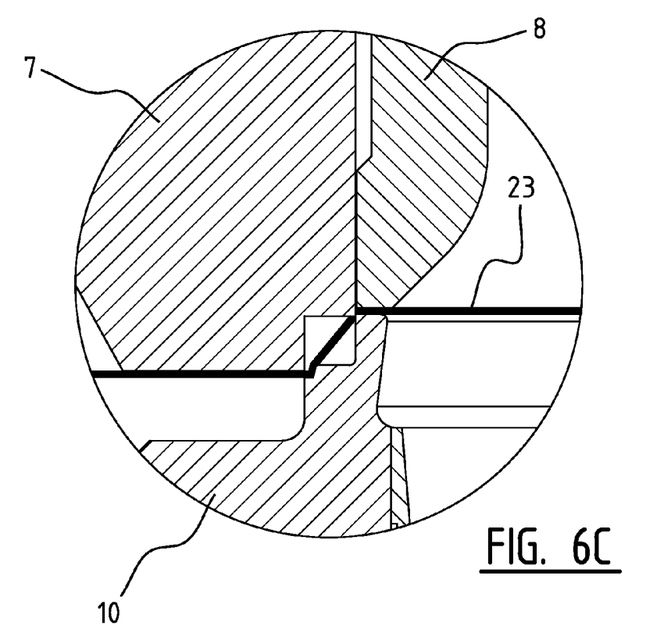

FIGS. 6A-6D show in steps the thermoforming process according to the invention making use of the embodiment of FIG. 5. In FIG. 6A the heated plastic foil 23 is placed between mould halves 5,6. In FIG. 6B lower mould 6 has performed an upward stroke and then clamps foil 23 between lower mould 6 and upper mould 5. Hold-down element 8 here presses foil 23 against cutting sleeve 10, so enabling calibration of the edge of the product. In FIG. 6C lower mould 6 is moved still further upward so that foil 23 is pre-cut through the cutting line defined by cutting plate 7 and cutting sleeve 10. This provides for sealing of the cavity. During this stroke the slot is also cut into the product through the auxiliary cutting line defined by cutting plate 7 and cutting sleeve 10.

After the pre-cutting the pre-stretcher will carry the material into the mould cavity. An increased pressure is then applied so as to press the plastic against the wall and the bottom of the mould cavity. Because the wall and the bottom of the cavity are kept at relatively low temperature, the plastic will take on a fixed form.

Figure 6D:
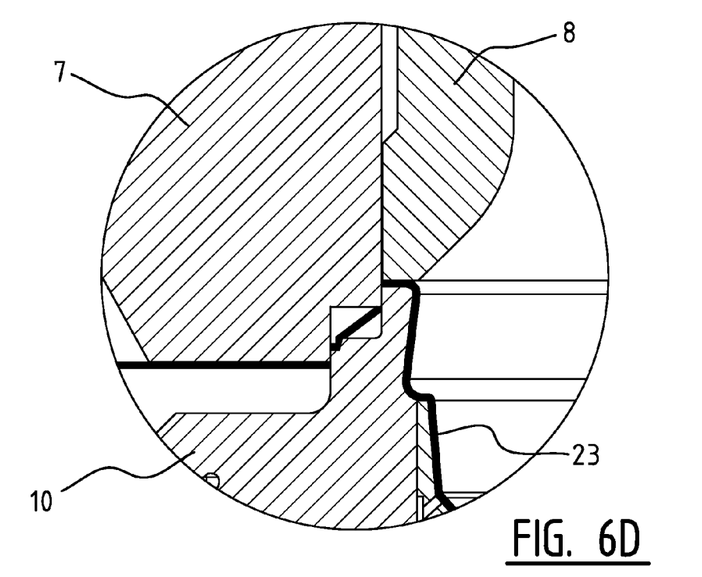

In FIG. 6D lower mould 6 has performed another short upward stroke, wherein cutting sleeve 10 is carried further into cutting plate 7. Here the product is cut completely from foil 23.

After the product has been cut out, lower mould 6 moves downward and the product will then be carried out of lower mould 6 in order to be stacked or further processed.

Figure 7:
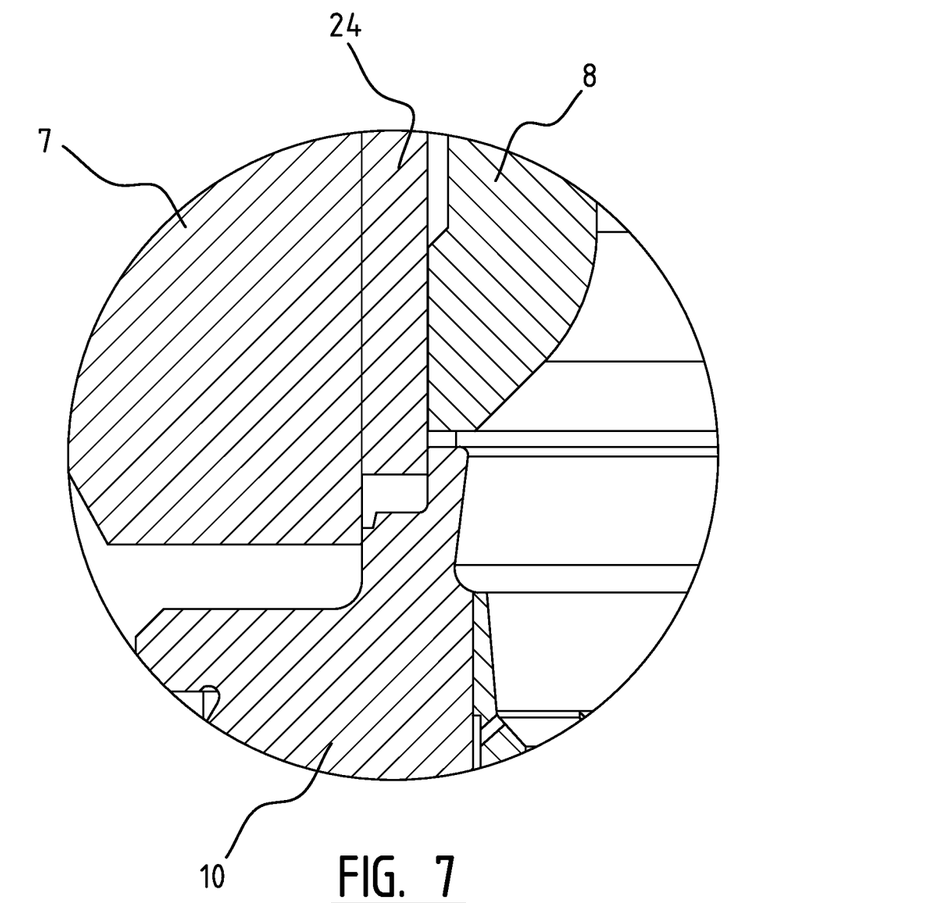
FIG. 7 shows a cross-section of an embodiment of the thermoforming device wherein the profiling of the cutting plate is mounted releasably on the cutting plate.

FIG. 7 shows a profiling 24 in cutting plate 7 which is mounted releasably, for instance by means of a screw connection. This profile is exposed to great forces during the thermoforming process and is therefore subject to wear. By removing only the profile, this component can be processed and/or repaired more easily.

Figure 8:
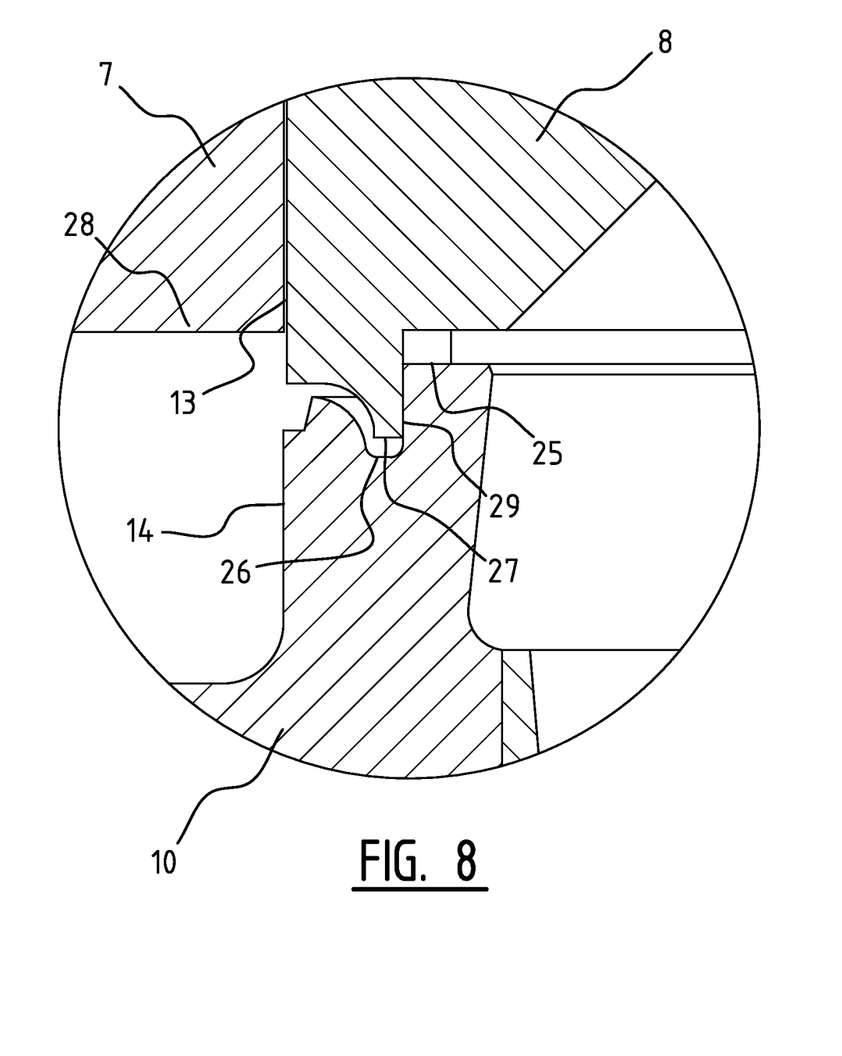
FIG. 8 shows a detail view of a cross-section taken at the position of a profiling for forming a slot in a product according to a second embodiment of the present invention.

FIG. 8 shows a detail view of a cross-section taken at the position of a profiling for forming a slot in a product according to a second embodiment of the present invention. In this embodiment the auxiliary cutting line is defined by a profiling on the hold-down element and the cutting sleeve. Shown in the profiling of the cutting sleeve are first lower platform 25 and second lower platform 26. Also shown are first upper platform 27 in the profiling of the hold-down element and second upper platform 28 in the profiling of the cutting plate. First upper wall 30 and first lower wall 29 define the auxiliary cutting line through which the plastic foil will be cut for the purpose of forming a slot. Also shown are second upper wall 13 and second lower wall 14, which have a function similar to the corresponding walls in FIG. 4.

FIGS. 9A-9E show in steps the thermoforming process according to the invention making use of the embodiment of FIG. 8. Each figure comprises a left-hand part and a right-hand part. The left-hand part shows a cross-section at the position of a profiling. The right-hand part shows a cross-section at a position where no profiling is present.

Figure 9A:
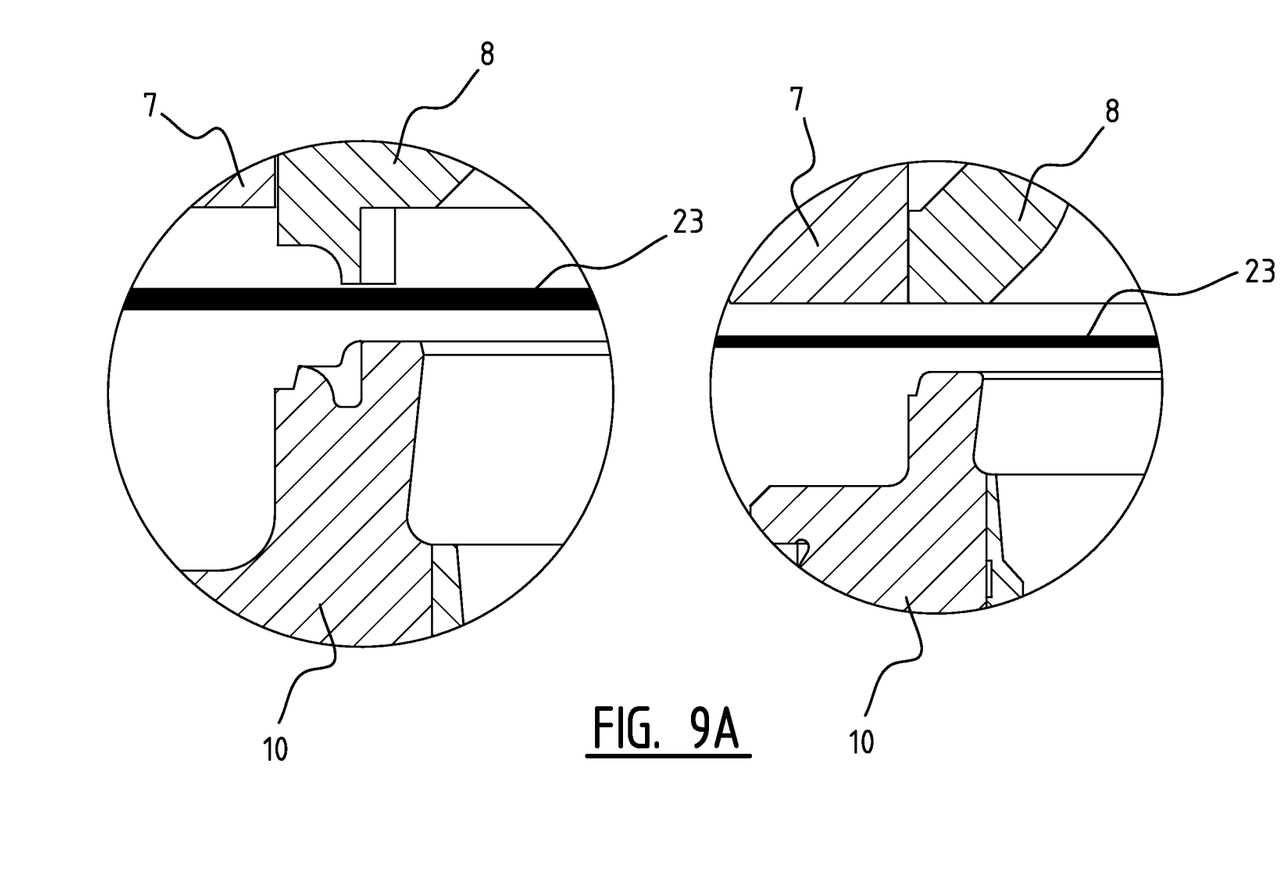
FIGS. 9A-9E show the most important process steps of the thermoforming method according to the invention making use of the embodiment of FIG. 8.

In FIG. 9A heated plastic foil 23 is placed between mould halves 5,6.

Figure 9B:
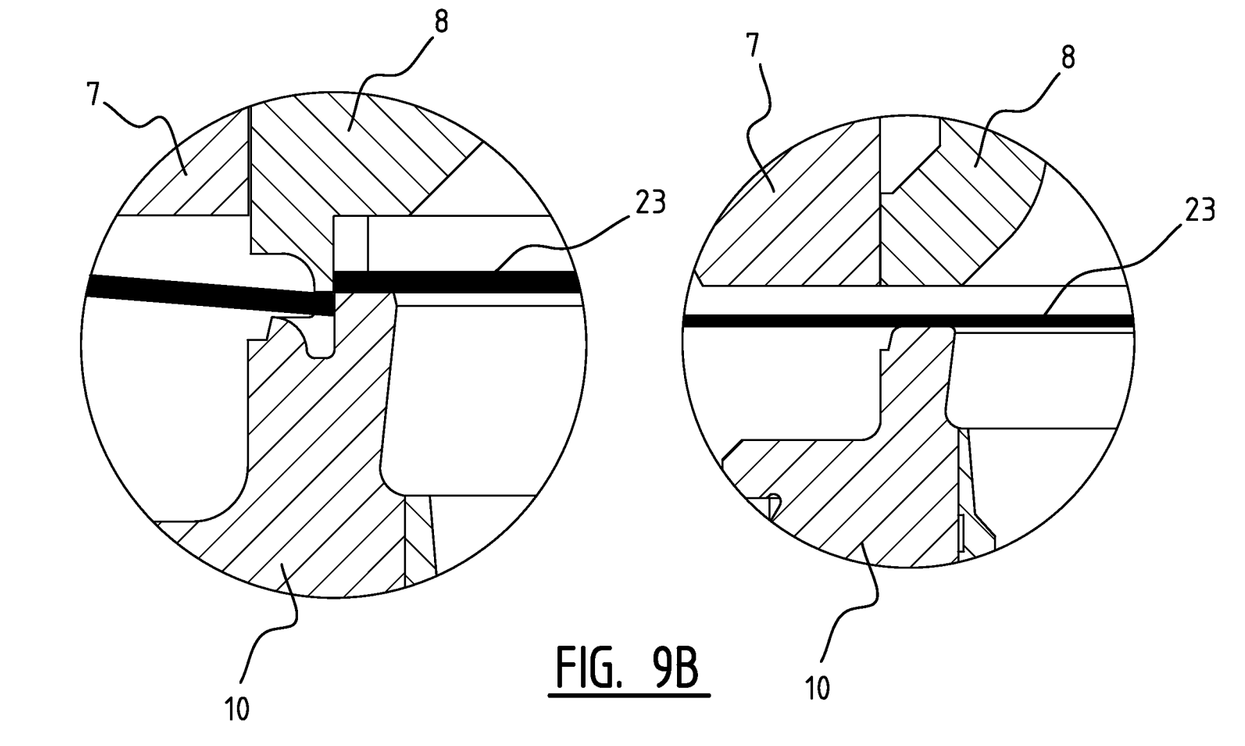

In FIG. 9B lower mould 6 has performed an upward stroke, wherein the hold-down element profiling makes contact with the foil and pre-cuts the slot in the foil in co-action with the profiling in the cutting sleeve.

Figure 9C:
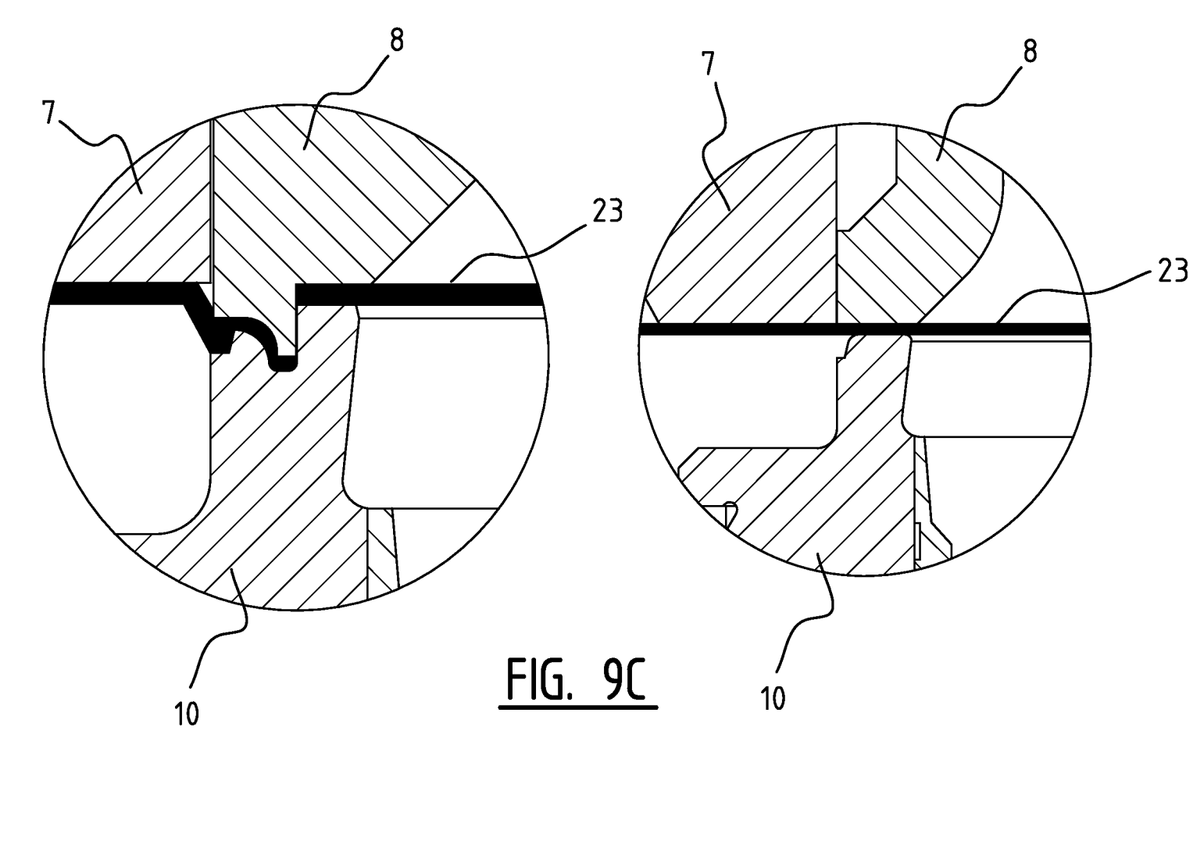

In FIG. 9C lower mould 6 is moved still further upward and then clamps foil 23 between lower mould 6 and upper mould 5. Hold-down element 8 here presses foil 23 against cutting sleeve 10, so enabling calibration of the edge of the product. During this stroke the slot in the product is also cut completely through the auxiliary cutting line defined by the hold-down element and cutting sleeve. The foil on the outer side of the slot is also calibrated in that the hold-down element presses the foil between the hold-down element profiling and cutting sleeve profiling.

Figure 9D:
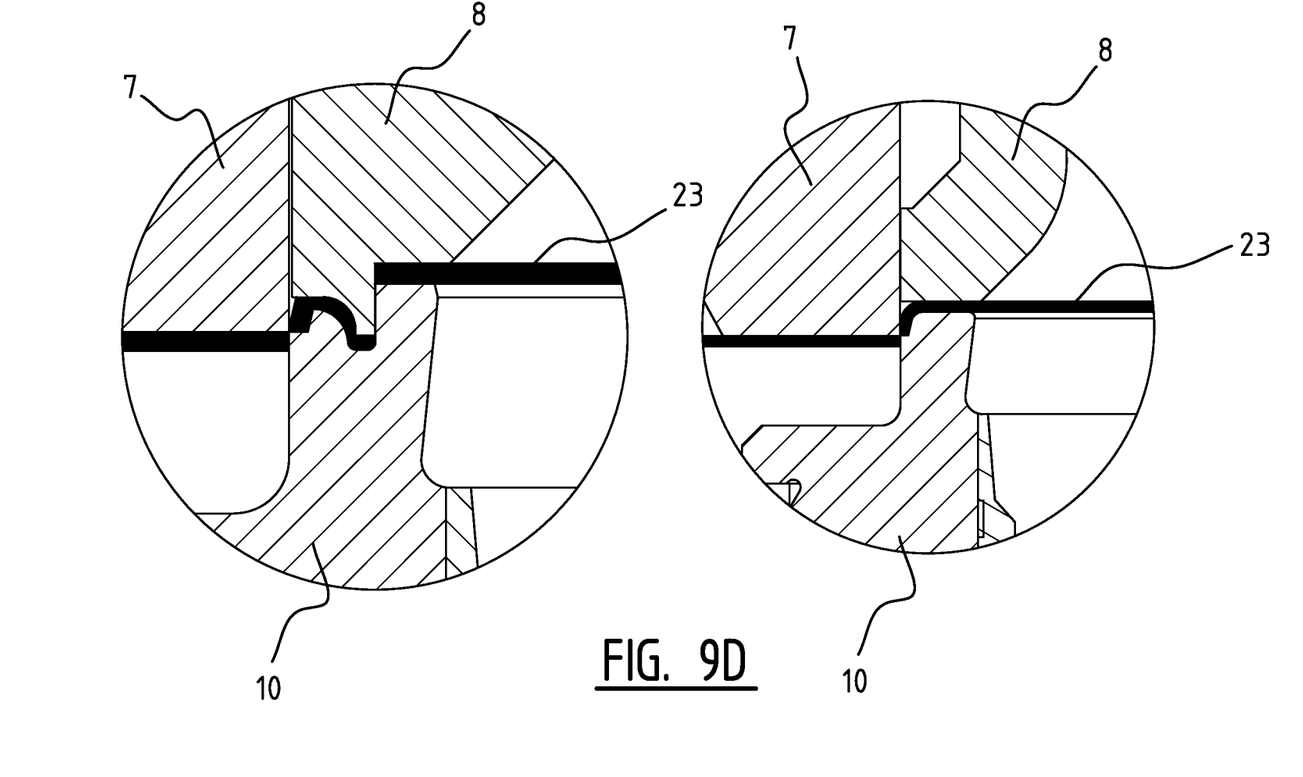

In FIG. 9D lower mould 6 is moved even further upward so that foil 23 is pre-cut through the cutting line defined by cutting plate 7 and cutting sleeve 10. This provides for a sealing of the cavity.

After the pre-cutting the pre-stretcher will carry the material into the mould cavity. An increased pressure is then applied in order to press the plastic against the wall and the bottom of the mould cavity. Because the wall and the bottom of the cavity are kept at relatively low temperature, the plastic will take on a fixed form.

Figure 9E:
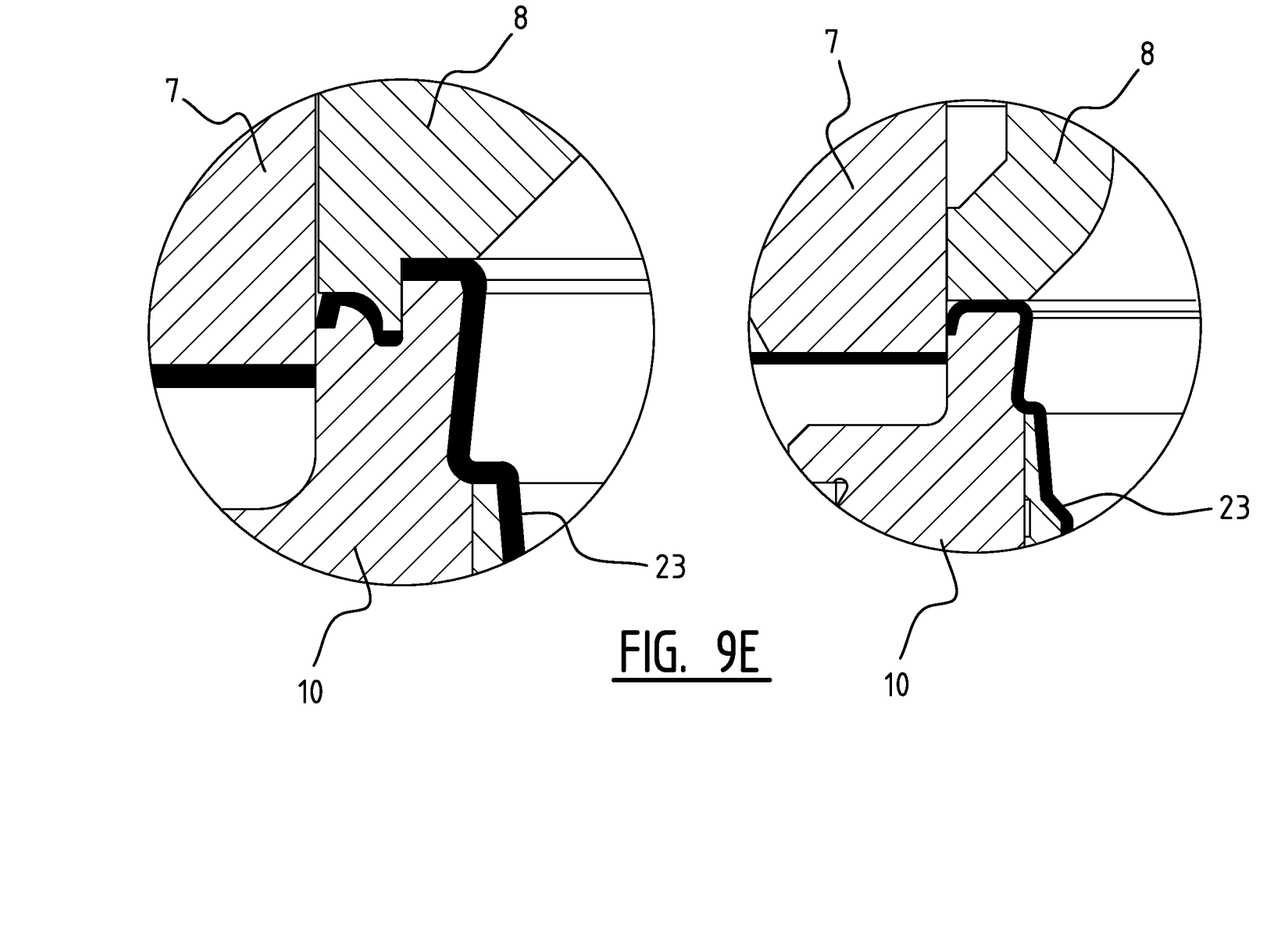

In FIG. 9E lower mould 6 has performed another short upward stroke, wherein cutting sleeve 10 is carried further into cutting plate 7. Here the product is cut completely from foil 23.

After the product has been cut out, lower mould 6 moves downward and the product will then be carried out of lower mould 6 in order to be stacked or further processed.

The invention is described in the foregoing inter alfa on the basis of embodiments thereof. It will be apparent to the skilled person that various alterations can be made without departing from the scope of protection defined by the appended claims.

The invention claimed is:

1. A thermoforming device for thermoforming a product from a plastic foil, comprising:
    a first mould provided with a cutting plate and a hold-down element accommodated movably in this mould; and
    a second mould provided with a forming sleeve and a cutting sleeve, wherein the first and second mould are movable relative to each other for the purpose of at least partially forming and cutting the plastic foil; wherein the hold-down element and cutting sleeve are adapted to clamp the plastic foil at least during the forming of the product and wherein the cutting sleeve and cutting plate together define a cutting line through which the plastic foil is cut in order to separate the product formed in the forming sleeve from the surrounding plastic foil;
    wherein the cutting sleeve and the cutting plate and/or hold-down element further define an auxiliary cutting line through which the plastic foil is cut in order to arrange a slot in the product to be formed, wherein the cutting sleeve, the cutting plate and/or the hold-down element are adapted to at least partially pass alongside each other at the position of the auxiliary cutting line for the purpose of said cutting.

2. The thermoforming device as claimed in claim 1, adapted to arrange the slot in an edge of the product to be formed.

3. The thermoforming device as claimed in claim 1, wherein the cutting line and the auxiliary cutting line are defined at a distance from each other.

4. The thermoforming device as claimed in claim 1, wherein the cutting sleeve and the cutting plate and/or hold-down element are provided with co-acting profiling for defining the auxiliary cutting line.

5. The thermoforming device as claimed in claim 4, wherein the profiling of cutting plate, hold-down element and/or cutting sleeve along a periphery thereof is discontinuous.

6. The thermoforming device as claimed in claim 4, wherein the cutting plate and/or hold-down element comprise an upper profiling and the cutting sleeve comprises a lower profiling, these being at least partially complementary.

7. The thermoforming device as claimed in claim 6, wherein the hold-down element is provided with a protrusion which is directed toward the cutting sleeve and which can co-act with a recess in the cutting sleeve in order to define the auxiliary cutting line.

8. The thermoforming device as claimed in claim 6, wherein the hold-down element has a profiling which is at least partially complementary to a profiling of the cutting plate.

9. The thermoforming device as claimed in claim 6, wherein both upper profiling and lower profiling comprise a plurality of platforms at different levels, wherein walls between the different platforms in cutting plate and/or hold-down element and cutting sleeve together define at least said auxiliary cutting line.

10. The thermoforming device as claimed in claim 9, wherein the upper profiling comprises a protrusion which is directed toward the hold-down element, wherein the hold-down element and cutting sleeve both comprise a recess which is at least partially complementary to this protrusion.

11. The thermoforming device as claimed in claim 10, wherein a surface of the protrusion facing toward the product to be formed is placed at a different level from another surface of the cutting plate associated with the definition of the cutting line.

12. The thermoforming device as claimed in claim 11, wherein said surface of the protrusion is placed at a greater distance from an outer side of the first mould facing toward the second mould than said other surface of the cutting plate.

13. The thermoforming device as claimed in claim 9, wherein the lower profiling comprises:
    a first lower platform for clamping the plastic foil;
    a second lower platform connected to the first lower platform by means of a first lower wall; and wherein the upper profiling comprises:
    a first upper wall;
    a first upper platform connected to the first upper wall;
    wherein the first upper wall and first lower wall together define the auxiliary cutting line.

14. The thermoforming device as claimed in claim 13, wherein the lower profiling further comprises a third lower platform connected to the second lower platform by means of a second lower wall, and wherein the upper profiling further comprises a second upper platform connected to a second upper wall, wherein the second upper wall and the second lower wall define the cutting line.

15. The thermoforming device as claimed in claim 14, wherein the first upper platform and second upper platform are mutually connected by means of the second upper wall.

16. The thermoforming device as claimed in claim 13, wherein said lower platforms slope downward relative to an outer side of the second mould facing toward the first mould as seen from the first lower platform, and wherein said upper platforms slope downward relative to an outer side of the first mould facing toward the second mould as seen from the first upper wall.

17. The thermoforming device as claimed in claim 6, wherein said upper profiling is mounted releasably on said cutting plate and/or said hold-down element for the purpose of exchanging the upper profiling.

18. The thermoforming device as claimed in claim 1, comprising guides for centering the relative movement of at least two of the first mould, the second mould, the hold-down element, the forming sleeve and the cutting sleeve.

19. A method for thermoforming a product from a plastic foil, comprising of:

clamping the plastic foil between a hold-down element in a first mould and a cutting sleeve in a second mould;

forming the product in a forming sleeve in the second mould;

moving first and second mould relative to each other in order to separate the product formed in the forming sleeve from the surrounding plastic foil, wherein the separation comprises of cutting through a cutting line defined by the cutting sleeve and cutting plate by means of relative movement of first and second mould; and arranging a slot in the product to be formed by cutting through an auxiliary cutting line defined by the cutting sleeve and the cutting plate and/or hold-down element by means of relative movement of first and second mould, wherein the cutting sleeve, the cutting plate and/or the hold-down element are adapted to at least partially pass alongside each other at the position of the auxiliary cutting line for the purpose of said cutting.

20. The method as claimed in claim 19, wherein arranging of the slot takes place prior to the forming of the product.

21. The method as claimed in claim 19, further comprising of pre-cutting the plastic foil by means of relative movement of first and second mould for the purpose of closing a cavity defined by the clamped plastic foil and the first and/or second mould.

22. The method as claimed in claim 19, wherein at least one of a profiling of the cutting plate, a profiling of the cutting sleeve and a profiling of the hold-down element are provided with co-acting profiling for defining the auxiliary cutting line.

* * * * *